US010471662B2

(12) United States Patent
Hairston et al.

(10) Patent No.: US 10,471,662 B2
(45) Date of Patent: Nov. 12, 2019

(54) CURED IN PLACE LINER TERMINATION

(71) Applicant: INA Acquisition Corp., Wilmington, DE (US)

(72) Inventors: Mark Hairston, Imperial, MO (US); Barry Paschall, Hillsboro, MO (US)

(73) Assignee: INA Acquisition Corp., Wilmington, DE (US)

(*) Notice: Subject to any disclaimer, the term of this patent is extended or adjusted under 35 U.S.C. 154(b) by 718 days.

(21) Appl. No.: 15/167,531

(22) Filed: May 27, 2016

(65) Prior Publication Data
US 2016/0348812 A1 Dec. 1, 2016

Related U.S. Application Data

(60) Provisional application No. 62/168,611, filed on May 29, 2015.

(51) Int. Cl.
*B29C 65/48* (2006.01)
*B29C 65/56* (2006.01)
(Continued)

(52) U.S. Cl.
CPC .............. *B29C 65/48* (2013.01); *B29C 63/26* (2013.01); *B29C 63/34* (2013.01); *B29C 63/36* (2013.01);
(Continued)

(58) Field of Classification Search
CPC ..... B29C 65/48; B29C 65/483; B29C 65/562; B29C 65/72; B29C 66/02;
(Continued)

(56) References Cited

U.S. PATENT DOCUMENTS 785,176 A 3/1905 Mommertz
2,088,922 A 8/1937 Porteous
(Continued)

FOREIGN PATENT DOCUMENTS

CA 2674984 A1 2/2011
WO WO2012104801 A1 8/2012

OTHER PUBLICATIONS

NORDITUBE Technologies AB, "NordiPipe Installation Manual", Jun. 2006, version 3.1, 49 pgs.
(Continued)

*Primary Examiner* — Philip C Tucker
*Assistant Examiner* — Brian R Slawski
(74) *Attorney, Agent, or Firm* — Stinson LLP

(57) ABSTRACT

A rehabilitated pipe system and a method for rehabilitating a pipe system. A lines a host pipe and a coupling member configured for being operatively coupled to a mechanical coupler is positioned adjacent the host pipe so that a connecting section of the liner extends into the coupling member. The connecting section of the liner is adhesively bonded to the coupling member, and the mechanical coupler is installed to fluidly couple the liner to another fluid conducting structure. The connecting section of the liner can be formed in a portion of the host pipe that is removed after lining. The coupling member can be flanged or include a lateral coupling tube. The mechanical coupler can, e.g., be a ductile iron coupler or a bolt.

29 Claims, 9 Drawing Sheets

(51) Int. Cl.
- *B29C 65/72* (2006.01)
- *B29C 65/00* (2006.01)
- *B32B 37/00* (2006.01)
- *F16L 55/165* (2006.01)
- *F16L 55/16* (2006.01)
- *B29C 63/26* (2006.01)
- *B29C 63/34* (2006.01)
- *B29C 63/36* (2006.01)
- *F16L 55/179* (2006.01)
- *B29L 23/00* (2006.01)

(52) U.S. Cl.
CPC ......... *F16L 55/165* (2013.01); *F16L 55/1608* (2013.01); *F16L 55/1651* (2013.01); *F16L 55/179* (2013.01); *B29C 65/483* (2013.01); *B29C 65/562* (2013.01); *B29C 65/72* (2013.01); *B29C 66/02245* (2013.01); *B29C 66/0326* (2013.01); *B29C 66/1142* (2013.01); *B29C 66/131* (2013.01); *B29C 66/5221* (2013.01); *B29C 66/5344* (2013.01); *B29C 66/612* (2013.01); *B29L 2023/22* (2013.01)

(58) Field of Classification Search
CPC ........ B29C 66/02241; B29C 66/02245; B29C 66/0326; B29C 66/1142; B29C 66/131; B29C 66/1312; B29C 66/301; B29C 66/5221; B29C 66/5344; B29C 66/612; F16L 55/165; F16L 55/1608; F16L 55/179; F16L 55/1651
USPC .... 156/60, 71, 90, 91, 92, 94, 98, 153, 250, 156/252, 253, 267, 293, 294, 296, 304.1, 156/304.2, 304.3, 307.1, 307.3; 285/55, 285/369; 137/97, 98, 109
See application file for complete search history.

(56) References Cited

U.S. PATENT DOCUMENTS

| | | |
|---|---|---|
| 3,228,096 A | 1/1966 | Albro |
| 3,235,291 A | 2/1966 | Jacoby |
| 3,347,568 A | 10/1967 | Weeden, Jr. et al. |
| 3,472,533 A | 10/1969 | Turner |
| 3,578,360 A | 5/1971 | Eliot |
| 3,758,361 A | 9/1973 | Hunter |
| 3,838,823 A | 8/1974 | Douglas |
| 3,968,552 A | 7/1976 | Hunter |
| 4,277,091 A | 7/1981 | Hunter |
| 4,335,752 A | 6/1982 | Sumner |
| 4,357,745 A | 11/1982 | Chlebowski |
| 4,691,740 A | 9/1987 | Svetlik et al. |
| 4,733,889 A | 3/1988 | Haines |
| 4,864,711 A | 9/1989 | Yokota |
| 4,887,848 A | 12/1989 | Burba |
| 5,199,153 A | 4/1993 | Schulte-Ladbeck |
| 5,282,654 A | 2/1994 | Hendrickson |
| 5,364,130 A | 11/1994 | Thalmann |
| 5,520,484 A | 5/1996 | Kamiyama et al. |
| 5,765,597 A | 6/1998 | Kiest, Jr. et al. |
| 5,780,123 A | 7/1998 | Kamiyama et al. |
| 5,941,576 A | 8/1999 | Krausz |
| 6,036,235 A * | 3/2000 | Anderson ............. F16L 15/006 285/383 |
| 6,086,111 A | 7/2000 | Harper |
| 6,123,109 A | 9/2000 | Kamiyama et al. |
| 6,293,556 B1 | 9/2001 | Krausz |
| 6,539,978 B1 | 4/2003 | McGuire |
| 6,539,979 B1 | 4/2003 | Driver |
| 6,631,739 B2 | 10/2003 | Kamiyama et al. |
| 6,979,025 B2 | 12/2005 | Conder et al. |
| 7,025,384 B2 | 4/2006 | Whitehead et al. |
| 7,344,161 B2 | 3/2008 | Howard et al. |
| 7,722,085 B2 | 5/2010 | Pionetti |
| 7,861,743 B1 | 1/2011 | Wren |
| 9,188,269 B2 | 11/2015 | Hairston et al. |
| 9,371,950 B2 | 6/2016 | Hairston et al. |
| 9,551,449 B2 | 1/2017 | Kiest, Jr. |
| 9,874,302 B2 | 1/2018 | Hairston et al. |
| 2003/0047939 A1 | 3/2003 | Whitehead et al. |
| 2005/0241713 A1 | 11/2005 | Kaneta et al. |
| 2006/0145479 A1 | 7/2006 | McIntyre |
| 2008/0029177 A1 | 2/2008 | Kamiyama et al. |
| 2009/0127851 A1* | 5/2009 | Stefani .................... F16L 23/12 285/368 |
| 2009/0293979 A1 | 12/2009 | Scott |
| 2010/0282351 A1 | 11/2010 | Kamiyama et al. |
| 2011/0083766 A1 | 4/2011 | Anders |
| 2013/0160886 A1 | 6/2013 | Wright, Jr. |

OTHER PUBLICATIONS

Depend-O-Lok, Inc., Victaulic Mechanical EndSeal Drawing, dated Feb. 23, 2005, 1 pg.
Blueprint of Cross Section of Hymax Reducer Coupling.
Management Summary—Miller Weko Seal.
Krausz, Hymax® Large Diameter Coupling 26"-48" Long Body 26"-60" product sheet.

* cited by examiner

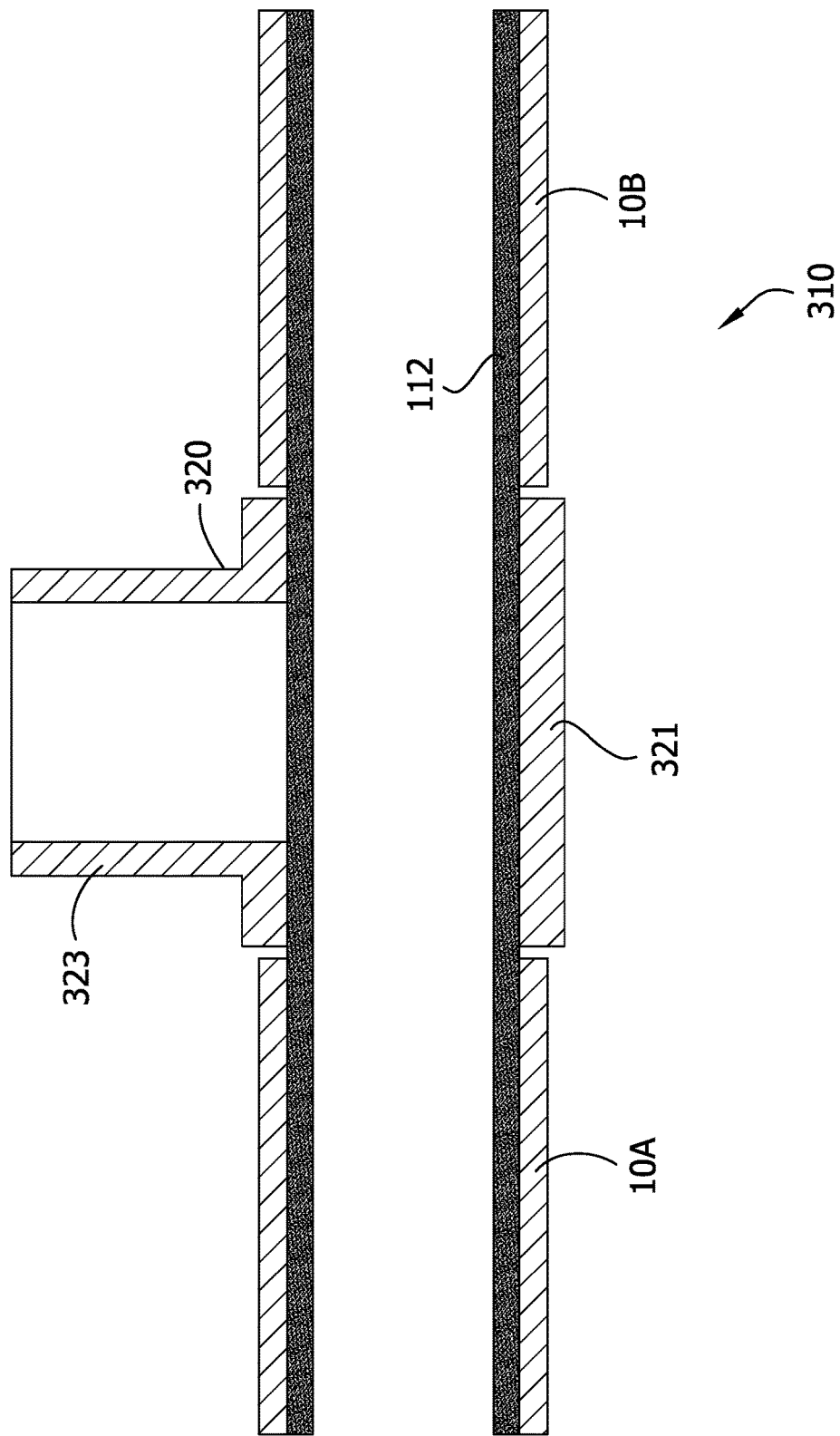

CURED IN PLACE LINER TERMINATION

CROSS REFERENCE TO RELATED APPLICATIONS

This application claims priority to U.S. Provisional Patent Application Ser. No. 62/168,611, entitled CURED IN PLACE LINER TERMINATION, which was filed on May 29, 2015, and is hereby incorporated by reference in its entirety.

FIELD

The present disclosure generally relates to pipe rehabilitation. In particular, the present disclosure relates to termination of a cured in place liner used to rehabilitate pipe.

BACKGROUND

The present disclosure relates to a cured in place liner system and methods for internally lining an existing pipe with a cured in place liner system. Conventional pipe lining operations that use more than one liner to line different lengths of an existing pipe system and also typically use components of the existing pipe system to form the rehabilitated flow path. For example, to form a rehabilitated fluid-tight flow path, adjacent ends of separate liners may seal with the existing host pipe rather than with components of the rehabilitation system. When some or all of an existing pipe is compromised, it may be desirable to form a rehabilitation system that does not rely on the host pipe to form a fluid tight flow path.

SUMMARY

In one aspect, a method for rehabilitating a pipe system comprises lining a host pipe of the pipe system. A coupling member is positioned in the pipe system so that a connecting section of the liner is received in the coupling member. The coupling member is located generally end to end with an end of the host pipe. The coupling member is configured for being operatively coupled to a mechanical coupler while it is being positioned end to end with the host pipe. The connecting section of the liner is adhesively bonded to the coupling member. The coupling member is fluidly coupled to another fluid conducting structure using the mechanical coupler, whereby the liner, the coupling member, and the mechanical coupler form a fluid tight connection between the host pipe and the other fluid conducting structure.

In another aspect, a method for rehabilitating a pipe system comprises positioning a liner comprising a curable polymer in a host pipe of the pipe system so that the liner lines an interior surface of the host pipe. The curable polymer is cured. An end portion of the host pipe is removed to expose a connecting section of the liner cured to conform to the interior surface of the end portion of the host pipe. A coupling member configured for being operatively coupled to a mechanical coupler is positioned so that the connecting section of the cured liner is received in the coupling member. The connecting section of the liner is adhesively bonded to the coupling member whereby the connecting section of the liner sealingly bonds to the coupling member.

In another aspect, a method for rehabilitating a pipe system comprises positioning a connecting section of a liner extending through a host pipe of the pipe system within a main coupling tube positioned generally end to end with the host pipe. A hole is formed in the connecting section of the liner to fluidly couple a lateral coupling tube extending from the main coupling tube to an interior of the liner. The connecting section of the liner is adhesively bonded to the main coupling tube using a curable polymer. The cured curable polymer forms a seal between the connecting section of the liner and the main coupling tube operative to prevent egress of liquid into an interface between the liner and the main coupling tube at the hole after the hole is formed.

Other aspects and features will be apparent and/or pointed out hereinafter.

BRIEF DESCRIPTION OF THE DRAWINGS

FIG. 7 is a schematic, fragmentary section of the pipe system having another pipe lining system installed therein.

Corresponding reference characters indicate corresponding parts throughout the drawings.

DETAILED DESCRIPTION

It is desirable to provide a cured in place pipe rehabilitation system extending through a portion of an existing pipe system to form a completely rehabilitated, stand-alone, fluid-tight flow path between upstream and downstream portions of the existing pipe system. The rehabilitated flow path is preferably stand-alone in that the rehabilitation system does not rely on the portion of the pipe system through which the rehabilitation system is installed to define the fluid-tight flow path. The task of forming a stand-alone rehabilitation system is made more difficult when the rehabilitation system includes a plurality of liners that line different lengths of the existing pipe system. To form a standalone rehabilitation system under these circumstances, the liners must be coupled together with coupling components other than the existing pipe system. Several embodiments of standalone pipe lining systems are described in U.S. Patent Application Publication No. 2012/0012217, which is hereby incorporated by reference in its entirety.

As will be apparent, in one or more embodiments of systems and methods of rehabilitating a pipe system, the flow path between the portions of the pipe system upstream and downstream of the rehabilitation system is defined by and made fluid-tight solely by components of the rehabilitation system such as cured in place liners and coupling components other than the existing pipe system. The portion of the pipe system through which the rehabilitation system is installed merely provides a path (e.g., through the ground) through which the cured in placer liner system can be inserted. After the cured in place liner system is installed, the liner system forms a fluid-tight flow path between an upstream portion of the pipe system and a downstream portion of the pipe system. It will be apparent to those of ordinary skill in the art that the rehabilitation system may occupy all or only a part of a pipe system. Other parts of the pipe system may even be lined, but with liners that rely on existing pipe to form joints.

Figure 1:
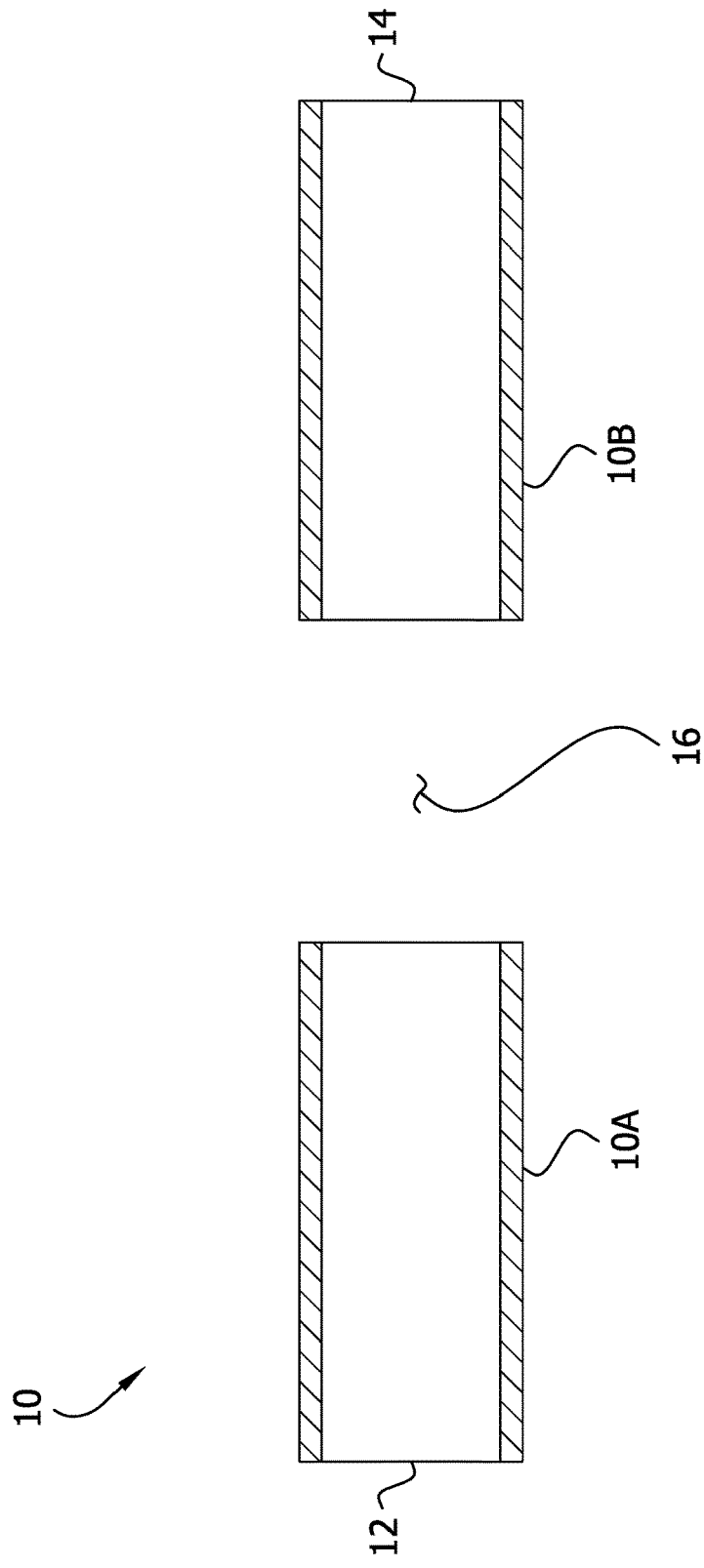
FIG. 1 is a schematic section of a pipe system.
Figure 2:
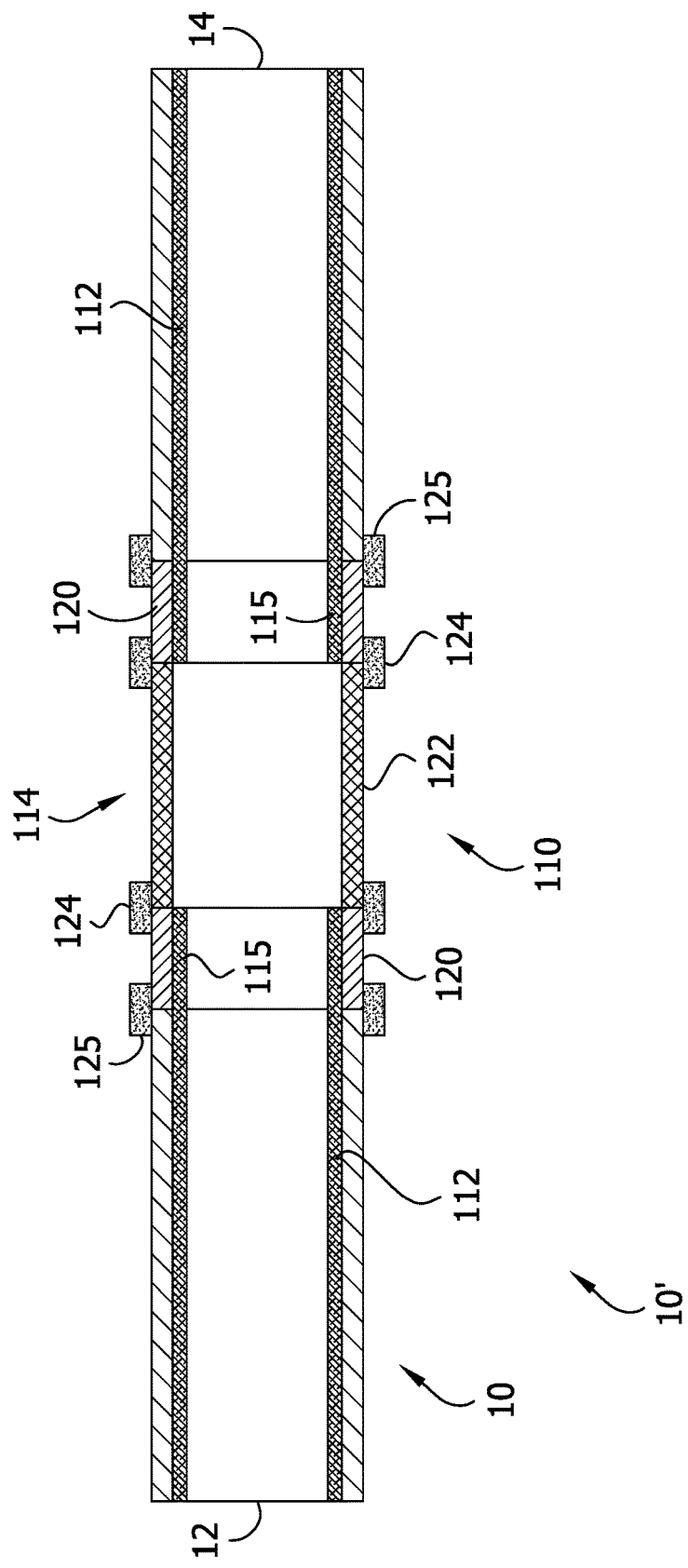
FIG. 2 is a schematic section of the pipe system having a pipe lining system installed therein.

Referring to FIG. 1, an existing pipe system in need of repair is generally indicated at reference number 10. The pipe system 10 may include one or more water pipes in a municipal water main, one or more high pressure pipes in an industrial processing facility, or any other host pipe(s) in need of repair. The pipe system 10 is preferably installed in the field at a location at which a pipe lining technician can access the pipe system to undertake pipe lining operations. In the illustrated embodiment, one or more pipe lining technicians can access one end of the pipe system 10 from a first access point 12 and can access an opposite end of the pipe lining system from a second access point 14. In other embodiments, the pipe lining technicians may access other portions of the pipe system 10 besides the opposite ends thereof without departing from the scope of the invention. As shown in FIG. 2, using the pipe lining system 110 and methods of rehabilitating a pipe system described in further detail below, the pipe system 10 may be rehabilitated to form a rehabilitated pipe system 10' in which no portion of the existing pipe system is used to form the flow path between the two access points 12, 14. Instead, the standalone pipe lining system 110 forms a continuous flow path along the length of the pipe system 10 between the two access points 12, 14.

Referring again to FIG. 1, in the illustrated embodiment, the pipe system 10 includes two lengths of pipe 10A, 10B arranged in series and separated from one another by a gap 16 in the pipe system. In one or more embodiments, the two pipes 10A, 10B may form a continuous pipe system before beginning a suitable method of rehabilitating the pipe system 10. In these embodiments, the pipe lining technicians may remove a portion of the pipe system 10 to form the gap 16 as an initial step in the method. This may be desirable, for example, when a conventional method for lining a pipe between two access points with a single liner cannot be used because the distance between the two access points to the existing pipe system is too long. In that instance, the gap 16 also functions as an access point. By performing the method of rehabilitation described below, the pipe lining technicians connect the two pipes 10A, 10B with the pipe lining system 110 and form a continuous fluid flow path that extends from the first access point 12 to the second access point 14. Although FIG. 1 illustrates two pipes 10A, 10B separated by a single gap 16, it will be understood that the pipe lining system 110 and method of rehabilitation described herein can be adapted to rehabilitate a pipe system comprising more than two pipes separated by more than one gap. In addition, the pipe lining system 110 and method of rehabilitation described herein can be used to line a single, continuous length of existing pipe and to connect the lined length of existing pipe to another fluid conducting structure. It will be understood that the other fluid conducting structure may be another pipe, another coupling member, a valve, other fitting or any other structure that conducts fluid.

Referring specifically to FIG. 2, the rehabilitated pipe system 10' will now be described. The rehabilitated pipe system 10' includes the existing pipe system 10 and a pipe lining system 110. The pipe lining system 110 lines the existing pipe system 10 between the first access point 12 and the second access point 14 and defines the fluid flow path between the two access points. The pipe lining system 110 includes a first liner 112 that lines the pipe 10A and a second liner that lines the pipe 10B. A coupling system 114 of the pipe lining system 110 extends between the pipes 10A, 10B and connects the first and second liners 112. Connecting sections 115 of each of the liners 112 extend into opposite end portions of the coupling system 114 to connect the liners to the coupling system.

The liners 112 separately line the interior surfaces of each of the pipes 110A, 110B and extend outward past the inner ends of the pipes into the gap 16. The liners 112 may be formed from any suitable pipe lining material but preferably comprise a liquid impregnable material impregnated with a curable polymer. For example, the liner 112 can comprise a layer of polyester felt (e.g., a fiberglass reinforced and needled felt matrix) with a layer of impermeable material (e.g., an elastomeric coating). Alternatively, the liner can comprise a fabric of reinforcing fibers such as glass, carbon, boron, aramid, basalt, ultra-high molecular weight polyethylene, or other high strength fibers. In one or more additional embodiments, the liner 112 comprises a curable polymer impregnated chopped strand mat. Preferably, the curable polymer impregnated material is at least somewhat conformable to conform to the shape of the interior surface of the pipe 10A, 10B in which it is installed. The curable polymer used in the liners 112 can be any suitable material. But in one or more embodiments, the curable polymer is a curable epoxy. For example, the curable polymer is a catalyzed vinyl ester resin in some embodiments.

The coupling system 114 is configured to join the connecting sections 115 of each of the liners 112, which extend inward past the inner ends of the host pipes 10A, 10B. The coupling system 114 includes a coupling member 120 that is attached to the connecting section 115 of each of the liners 112. More specifically, a connecting section 115 of each of the liners 112 extends into a respective one of the coupling members 120 wherein it is adhesively bonded to the interior surface. The nature of the bond of the liner to the coupling member is such that there is a seal so that liquid under pressure cannot pass between the liner and the coupling member 120. A connecting tube 122 extends between the inner ends of the coupling members 120. Mechanical couplers 124 couple the coupling members 120 to the connecting tube 122. In one or more embodiments, positioning members 125 (e.g., a pipe clamps) also hold the coupling members 120 in place with respect to the host pipes 10A, 10B. But in other embodiments, no positioning members are used to hold the coupling members 120 to the host pipes 10A, 10B. Together, the two liners 112, two couplers 114, and connecting tube 122 define a standalone fluid flow path that extends from the first access point 12 to the second access point 14 and that is fluidly disconnected from the existing pipe system 10. Although the illustrated embodiment uses two coupling members 120 and one connecting tube 122 to join the first and second liners 112, it will be understood that other coupling systems can be arranged differently without departing from the scope of the invention. For example, in one or more embodiments, the connecting tube 122 is not used and the coupling members 122 are coupled directly to one another with a mechanical coupler 124. In one or more additional embodiments, a single coupling member 120 which is bound to a single liner 112 is coupled directly to a section of the existing pipe system 10 or a newly installed pipe, rather than to another liner.

Each of the coupling members 120 comprises a tube configured to be joined with a mechanical coupler. The coupling members 120 can have the same interior and exterior dimensions as the pipe 10A, 10B to which they are adhered, or they can have different dimensions without departing from the scope of the invention. In a preferred embodiment, the coupling members 120 are formed of a material that binds with the curable polymeric material in the connecting sections 115 of the liners 112. The coupling members 120 are also preferably formed from a rigid or semi-rigid material that can withstand the loading imparted thereupon by the mechanical coupler 124. In one or more preferred embodiments, the coupling members 120 are configured to withstand operational fluid pressures of the existing pipe system 10 and surge pressures therein. Likewise, the coupling members 120 are preferably configured to withstand externally applied loads such as soil, groundwater and live loads. In certain pipe systems 10, the coupling members 120 should be configured to withstand applications of vacuum pressures. The coupling members 120 may also satisfy other design criteria without departing from the scope of the invention.

In an exemplary embodiment, the coupling members 120 are each made from a fiber reinforced polymer. The coupling members 120 are fully cured prior to receiving the liner 112 through them. For example, in one or more suitable embodiments, the coupling members 120 include fiberglass. Other types of fiber reinforced polymers may also be used without departing from the scope of the invention. In one or more embodiments, the polymeric material used in the coupling members 120 has the same or closely similar composition as the curable polymeric material in the liners 112 to enhance chemical adhesive bonding between the coupling members 120 and the connecting sections 115 of the liners.

Figure 8A:
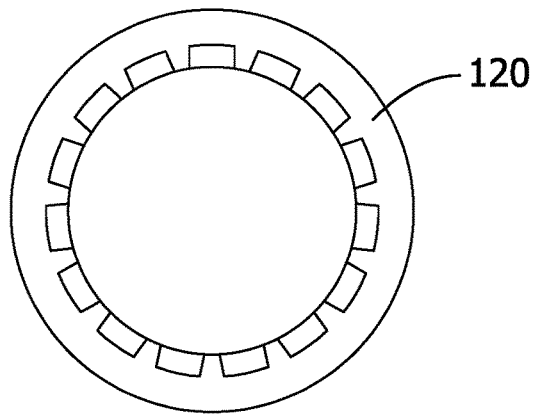
FIG. 8A is an end view of a coupling member of the pipe lining system of FIG. 2.
Figure 8B:
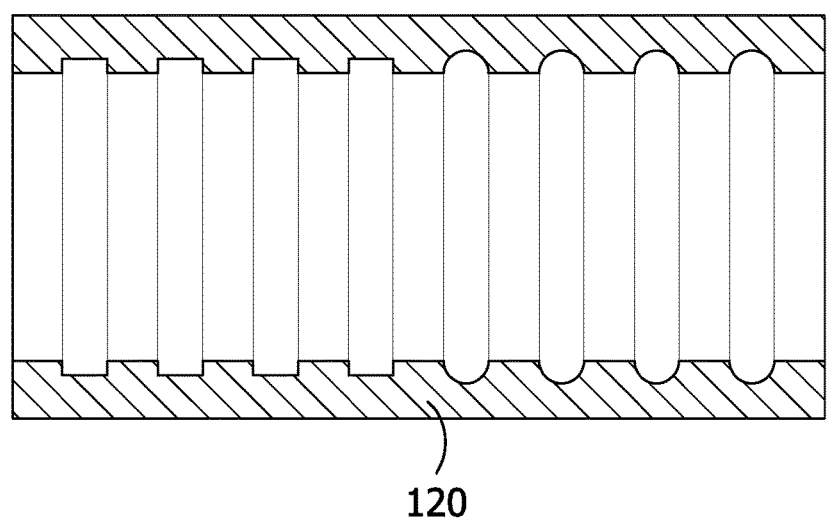
FIG. 8B is a section of another coupling member of the pipe lining system of FIG. 2.

In addition, the interior surface of the coupling members 120 may be prepared prior to installation to provide surface characteristics that create mechanical interlocking between the interior surface of the coupling members and the curable polymer which binds the liners 112 to the coupling members. In one example, the same polymeric material impregnating the liner is applied to the interior surface of the coupling members 120. In another example, the interior surface of the coupling members 120 may be abraded with an abrader to roughen the surface prior to installation in the pipe lining system 110. As shown in FIG. 8A, in one example, longitudinal grooves are formed in the interior surface of the coupling member 120. In another example shown in FIG. 8B, circumferential grooves are formed in the interior surface of the coupling member 120. The longitudinal and circumferential grooves may be formed by the original manufacturer of the coupling member 120 in some embodiments. Alternatively, the grooves can be formed by the pipe lining crew after the coupling member 120 is manufactured.

In another exemplary embodiment, the coupling members 120 are each made from a metallic material that has an interior surface that has been prepared to adhesively bind with the curable polymeric material in the connecting section 115 of the respective liner 112. For example, the coupling member 120 could be made of steel or ductile iron that has an interior surface that has undergone one or more of the following surface preparations to enhance bonding: cleaning, abrading, grinding, etc. In this embodiment, a polymeric material that sealingly bonds with metal is used. An example of such a polymeric material is TYFO® S, available from Fyfe Co. LLC of San Diego, Calif. Other types of metals and other types of materials may also be used without departing from the scope of the invention.

The connecting tube 122 can be made from any suitable material. Preferably the connecting tube 122 comprises a rigid or semi-rigid material that can withstand the loading imparted thereupon by the mechanical coupler 124. Moreover, the connecting tube 122 is preferably made from a material suitable for carrying the type of fluid that travels through the existing pipe system. For example, in one or more embodiments, the connecting tube is made from one of fiber reinforced polymer, plastic, metal, or the like. In one or more preferred embodiments, the connecting tube 122 is configured to withstand operational fluid pressures of the existing pipe system 10 and surge pressures therein. Likewise, the connecting tube 122 is preferably configured to withstand externally applied loads such as soil, groundwater and live loads. In certain pipe systems 10, the connecting tube 122 should be configured to withstand applications of vacuum pressures.

Various types of couplers 124 may be used to couple the components of the coupling system 114. Example couplers that may be used include ductile iron couplings or sleeves or other off the shelf couplers. The coupling members 120 provide a strength and have an outer diameter that will accommodate standard couplers. Preferably the couplers are configured to join adjacent end portions of the coupling members 120 to the connecting tube 122 to form a liquid tight fluid flow path through the pipe lining system 110.

Thus, it will be appreciated that one or more embodiments of a rehabilitated pipe system can include at least one existing host pipe 10A, a coupling member 120 positioned at an end of the existing host pipe, a liner 112 lining the existing host pipe and comprising a connecting section 115 extending into the and being bonded to the coupling member, and a mechanical coupler 124 (e.g., a ductile iron coupler) securing the coupling member to another fluid conducting structure, such as the connecting tube 114 and thereby fluidly coupling the liner to the other fluid conducting structure. The rehabilitated pipe system can further include another existing host pipe 10B, another coupling member 120 positioned at an end of the other host pipe, another liner 112 lining the other host pipe and comprising a connecting section 115 extending into and being bonded to the other coupling member, and another mechanical coupler 124 (e.g., another ductile iron coupler) securing the other coupling member to the connecting tube. The couplers 124 and the connecting tube 114 thereby fluidly couple one of the liners 112 to the other. As explained below, either of the coupling members used in this rehabilitated pipe system can comprise a lateral coupling member without departing from the scope of the invention.

Figure 6:
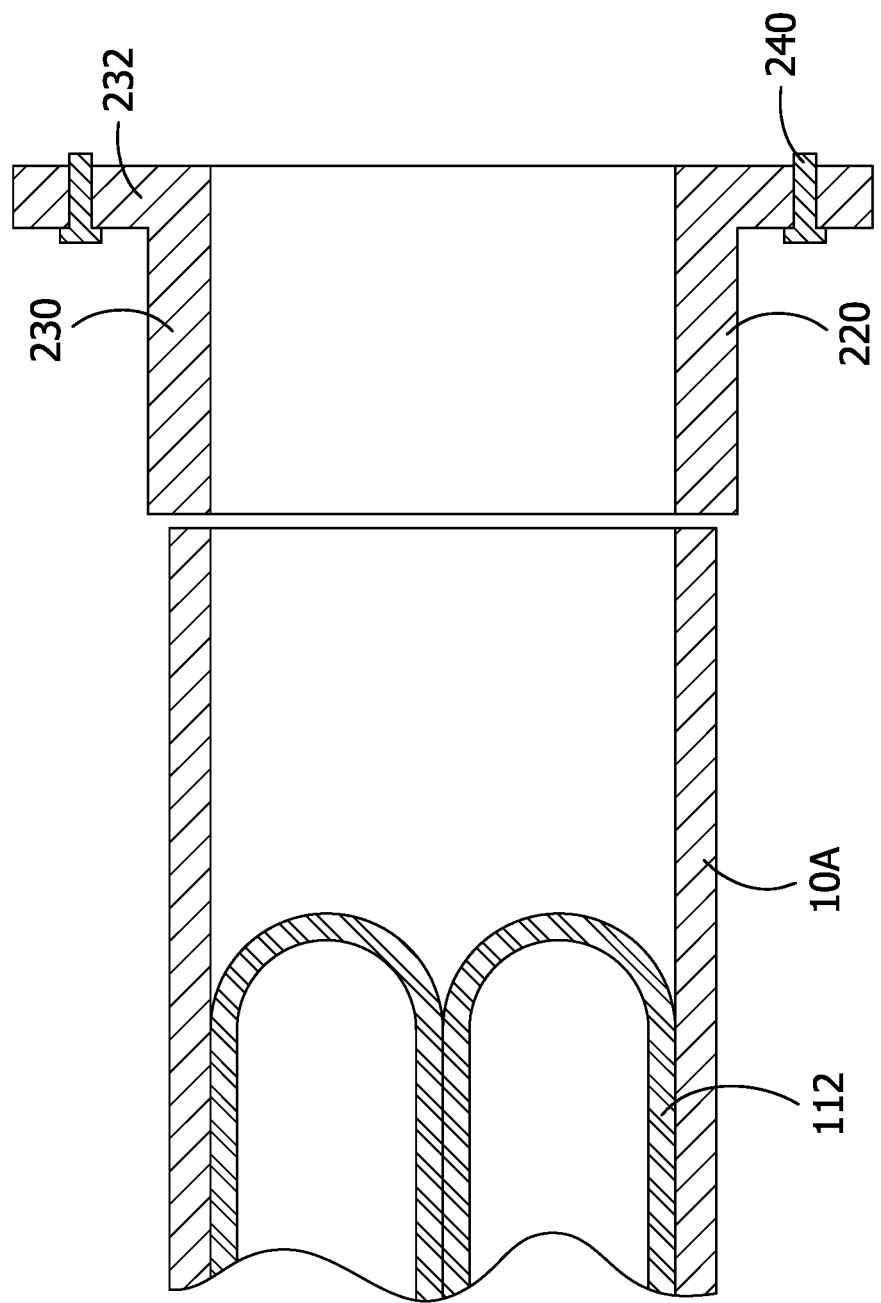
FIG. 6 is a schematic, fragmentary section similar to FIG. 3, but illustrating a flanged coupling member.

Referring to FIG. 6, in one or more embodiments, the lined pipe system 110 includes a flanged coupling member 220 comprising a tube shaped portion 230 and a flange portion 232 extending radially outward from the end of the tube shaped portion. In other words, the coupling member has a first end segment located adjacent the end of the existing host pipe 10 and a second end segment opposite the first end segment and defining a flange 232. In the illustrated embodiment, the coupling member 220 couples to the flanged end of another pipe member. For example, the coupling member 230 could be coupled to the flanged end of a connecting tube (not shown), the flange portion of another coupling member (not shown), the flanged end of a section of existing host pipe (not shown), or the flanged end of a new pipe (not shown). Flanged coupling members 220 could be attached to each of the liners 112 that line each of the pipes 10A, 10B, or only one flanged coupling member could be used. One or more compressive mechanical couplers 240 (broadly, a fastener, e.g., bolts or the like) may be used to couple the flange portion 232 of the coupling member 220 to the flange of another fluid conducting structure. Suitably, the flanged coupling member 230 may be positioned at the end of an existing host pipe 10 after removing a portion of the existing pipe system to define the end of the existing host pipe.

Figure 3:
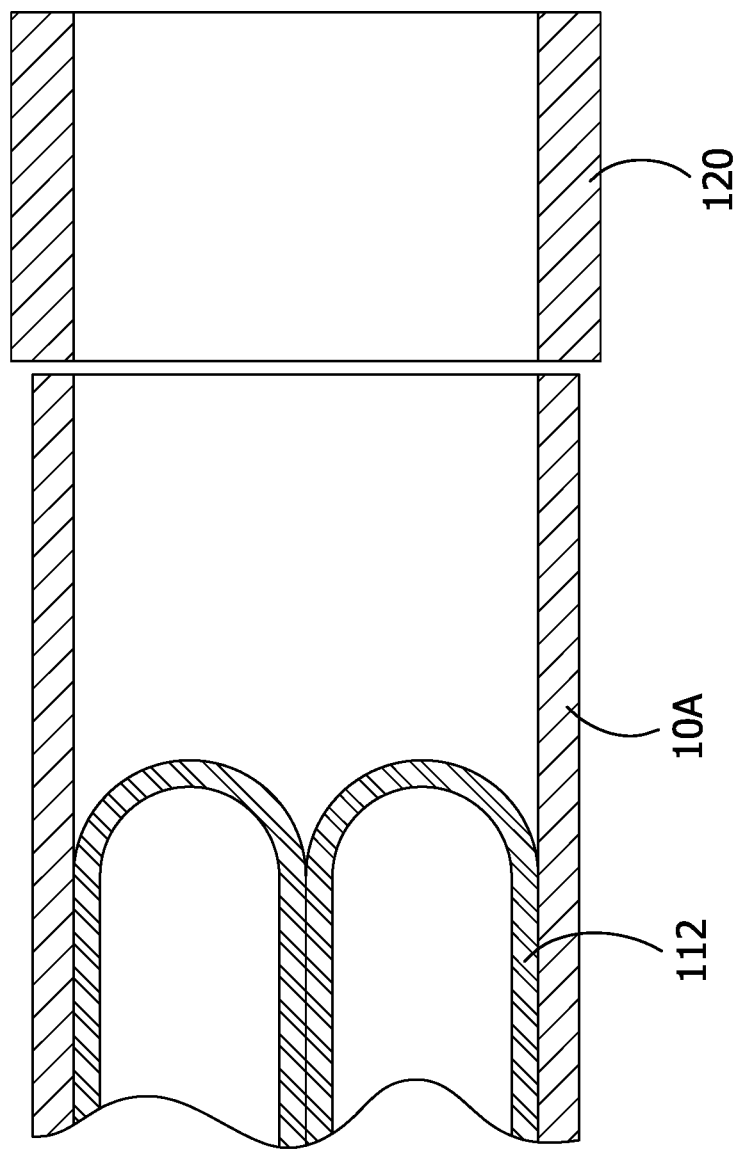
FIG. 3 is a schematic, fragmentary section of one pipe of the pipe system with a liner of the pipe lining system extending into the pipe and a coupling member of the pipe lining system positioned generally end to end with the pipe.
Figure 4:
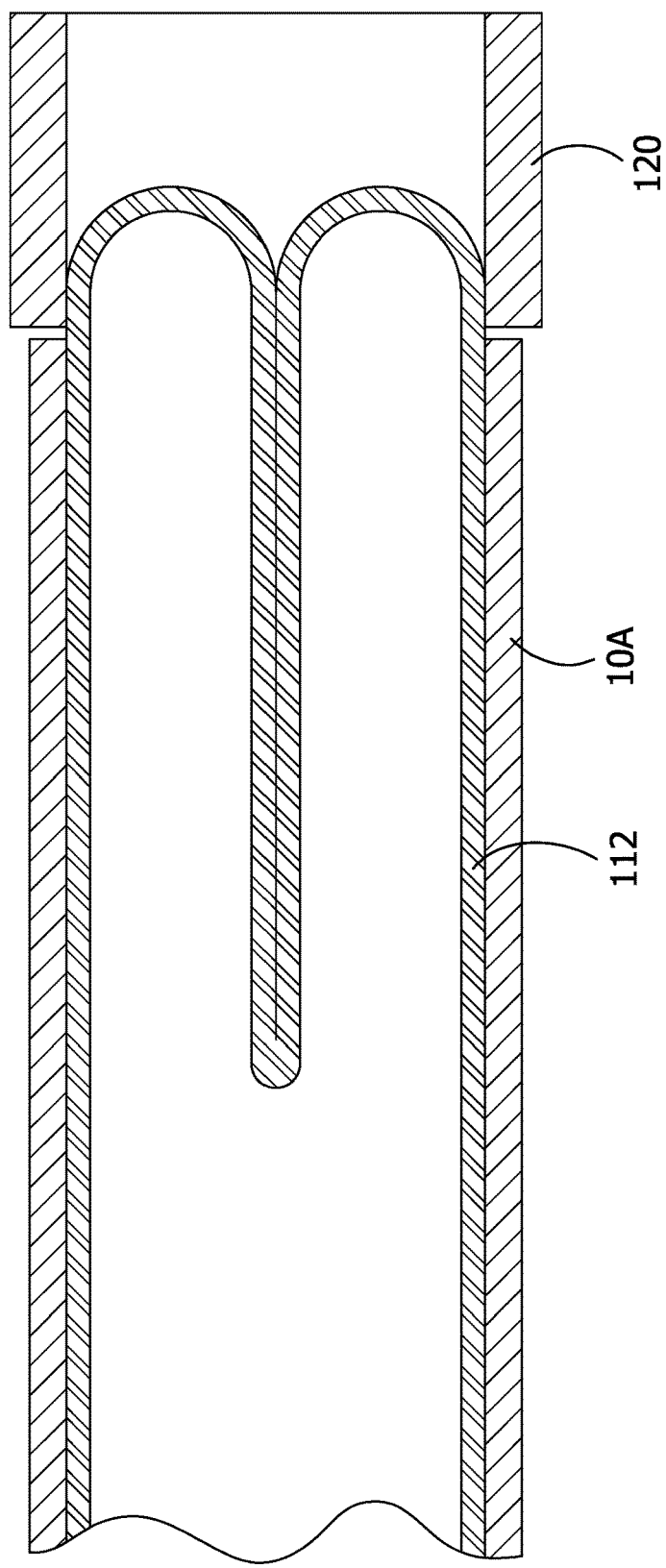
FIG. 4 is the schematic, fragmentary section of FIG. 3, but with the liner extending through the pipe and into the coupling member.
Figure 5:
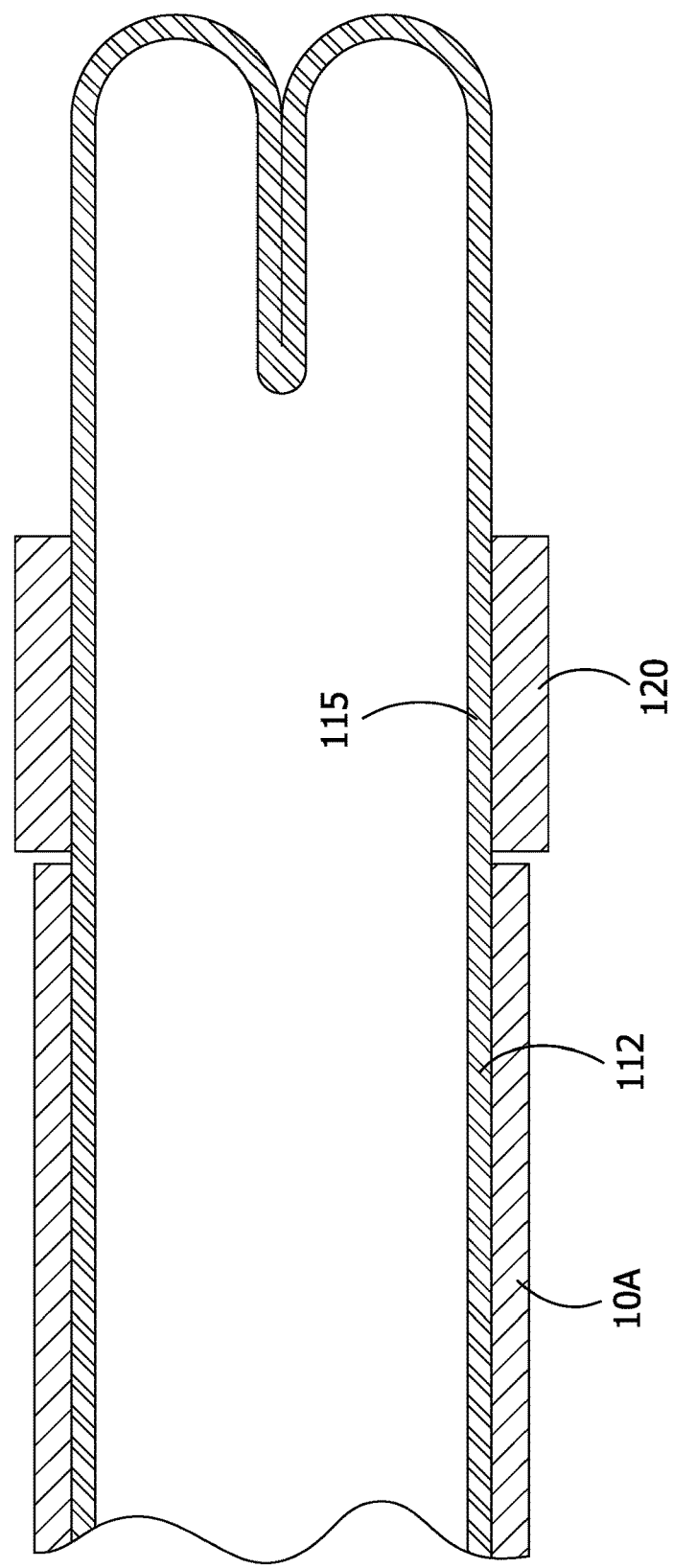
FIG. 5 is the schematic, fragmentary section of FIG. 3, but with the liner extending through the pipe and the coupling member.

Referring to FIGS. 3-5, one method of lining the first pipe 10A to form a first portion of the pipe lining system 110 will now be described. As will be apparent, the same techniques and components used to line the first pipe 10A may also be used in the same way to line the second pipe 10B. Once each of the pipes 10A, 10B have been lined as described below, the portions of the pipe lining system 110 used to line each of the sections may be coupled together using the coupling system 114.

In one or more embodiments of a method of reinforcing the pipe system 10, the coupling member 120 is positioned in the gap 116 between the pipes 10A, 10B. More specifically, the coupling member 102 is positioned generally end-to-end with the pipe 10A. For example, in the illustrated embodiment, an end of the coupling member 120 abuts the opposing inner end of the pipe 10A. In other embodiments (e.g., when the exterior dimensions of the coupling member 120 are slightly smaller than the interior dimensions of the pipe 10A), an end portion of the coupling member 120 may be positioned inside an end portion of the pipe 10A. In still other embodiments, the end of the coupling member 120 is positioned adjacent the end of the pipe 10A but does not directly contact the pipe. When the coupling member 120 is positioned generally end-to-end with the pipe 10A, the interior of the coupling member is preferably generally aligned with the interior of the pipe. One or more technicians may manually position the coupling member 120 generally end to end with the pipe 10A, or the technicians may use the positioning member 125 or other positioning device to position the coupling member generally coaxially with the pipe 10A.

Depending on the type of material that is used for the coupling member 120, the interior surface of the coupling member is prepared prior to installing the liner 112 in the pipe 10A and coupling member. For example, if the coupling member 120 is formed of metal, the pipe lining technicians preferably clean and abrade the interior surface to enhance adhesive binding with the liner 112. The technicians may prepare the interior surface of the coupling member 120 before or after positioning the coupling member generally end to end with the pipe 10A. If the coupling member 120 is made of fiber reinforced polymer, the interior surface is preferably roughened to increase the mechanical bonding between with the curable polymer in the liner 112. In addition, the step of preparing the interior surface of the coupling member 120 may include applying a coat of curable polymeric material to the interior surface. Preferably, the curable polymeric material applied directly to the interior surface of the coupling member is the same material as is impregnated in the liner 112 to enhance chemical adhesive bonding.

With the coupling member 120 positioned generally end to end with the pipe 10A, the pipe lining technicians may next install the liner 112. The positioning member 125 may hold the coupling member 120 in position at the end of the host pipe 10A, 10B as technicians install the liner 112. Alternatively, the coupling member 120 may be manually held in place during installation of the liner 112. The polymer impregnable material used in the liner 112 is impregnated with a curable polymer, and the liner is positioned in the pipe 10A so that the liner extends from at least the first access point 12 through the coupling member 120 as illustrated in FIG. 5. In the installed position, the liner substantially covers the interior surfaces of the pipe 10A and the coupling member 120. Specifically, the connecting section 115 of the liner 112 covers and contacts the interior surface of the coupling member 120. Typically, when the liner 112 is pressurized to contact the interior surfaces of the pipe 10A and coupling member 120. The pressurized liner 112 holds the coupling member 120 in position once it contacts the interior surfaces. In the illustrated embodiment, the liner 112 is everted through the pipe 10A and the coupling member 120. But the liner 112 can also be installed in the pipe 10A and coupling member 120 using a pull in method or any other suitable liner positioning method. Preferably, the technicians install the liner 112 so the liner contacts the interior surfaces of the pipe 10A and the coupling member 120, and extends past the inner end of the coupling member (FIG. 5). If the interior surface of the coupling member 120 has different dimensions than the interior surface of the pipe 10A, the liner 112 is preferably installed to have a smooth transition across the joint between the pipe and the coupling member. After the liner 112 is installed, the polymer material is cured.

In another embodiment, the liner 112 is installed before positioning the coupling member 20. For example, the liner 112 can be installed so that a connecting section 115 of the liner extends out of an end of the host pipe 10 before being cured. The coupling member 120 can be subsequently positioned end to end with the host pipe and the liner 112 can be pressed against the interior of the coupling member and cured. In another embodiment, as explained below, the installers can place the liner 112 in the host pipe 10 so that a connecting section of the liner is received in a mold (not shown) that is subsequently removed. As explained below, in still other embodiments, an end segment of the host pipe 10, itself, acts as a mold for the connecting section 115 of the liner 112 and is removed after curing. When the connecting section 115 is cured prior to placement of the coupling member 120, the installers subsequently apply an adhesive to one of the connecting section 115 of the liner 112 and the coupling member 120 and adhesively bond the liner to the coupling member after positioning the coupling member so that the connecting section is received in the coupling member.

Thus it can be seen that, in general, a suitable method of rehabilitating a pipe system can include the following steps in interchangeable order: lining a host pipe 10 with a liner 112 and positioning a coupling member 120 in the pipe system so that a connecting section 115 of the liner is received in the coupling member. During the step of positioning the coupling member 120 in the pipe system, the coupling member is configured for being operatively coupled to a mechanical coupler 124. Thus, the coupling member 120 has sufficient strength and rigidity throughout its use in the method to effectively support a mechanical coupler 124. The method further includes the step of adhesively bonding the connecting section 115 of the liner 112 to the coupling member 120, which can be performed by curing the curable polymer impregnating the liner or separately adhering the connecting section to the coupling member. After bonding the connecting section 115 to the coupling member 120, the coupling member can be fluidly coupled to the connecting tube 114 or another fluid conducting structure using the mechanical coupler 124. The liner 112, the coupling member 120, and the mechanical coupler 124 thereby form a fluid tight connection between the host pipe and the connecting tube 114.

Referring again to FIG. 2, once both liners 112 have been installed in the respective pipes 10A, 10B and coupling members 120 and cured, the excess portions of the liners that extend inward past the inner ends of the respective coupling members are removed. With both liners trimmed to size, the pipe lining technicians position the connecting tube 122 in line with the coupling members 120 and secure the connecting tube 122 to the coupling members 120 using the mechanical couplers 124. Once the pipe lining system 110 has been fully installed, the liners 112, coupling members 120, and connecting tube 122 define a standalone fluid flow path extending from the first access point 12 to the second access point 14 and that is fluidly separate from the existing pipe system 10.

It will be understood that the above described method can be adapted so that fewer components of the pipe lining system 110 may be used. For example, in one or more embodiments, a liner 112 and coupling member 120 are installed on only one pipe, rather than two. In these embodiments, a coupler 124 preferably joins the coupling member 120 directly to another section of pipe such as another section of existing host pipe. In other embodiments, the coupling members 120 are positioned to be joined to one another using a mechanical coupler 124, rather than being separately joined to a connecting tube 122. Still other changes to the above described method of rehabilitating the pipe system 10 may be implemented without departing from the scope of the invention. For example, the flanged coupling members 220 and bolts 240 (FIG. 6) could be substituted for the coupling member 120 and coupler 124 illustrated in FIGS. 3-5.

Figure 9A:
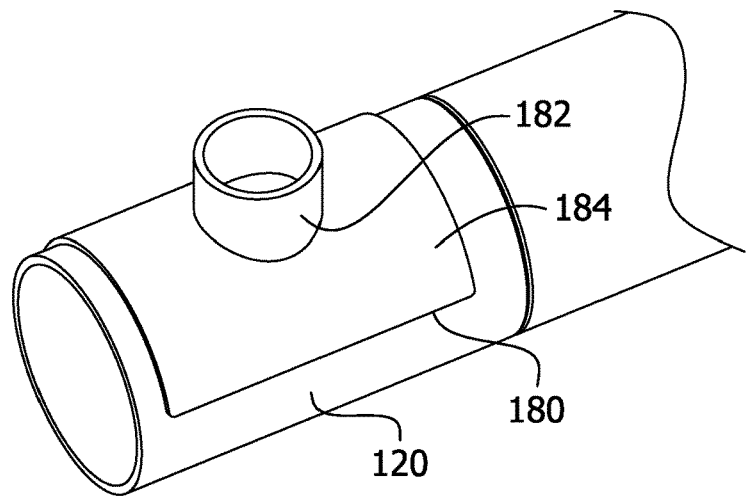
FIG. 9A is a perspective of an end portion of a pipe with a coupling member and lateral connector operatively connected thereto.
Figure 9B:
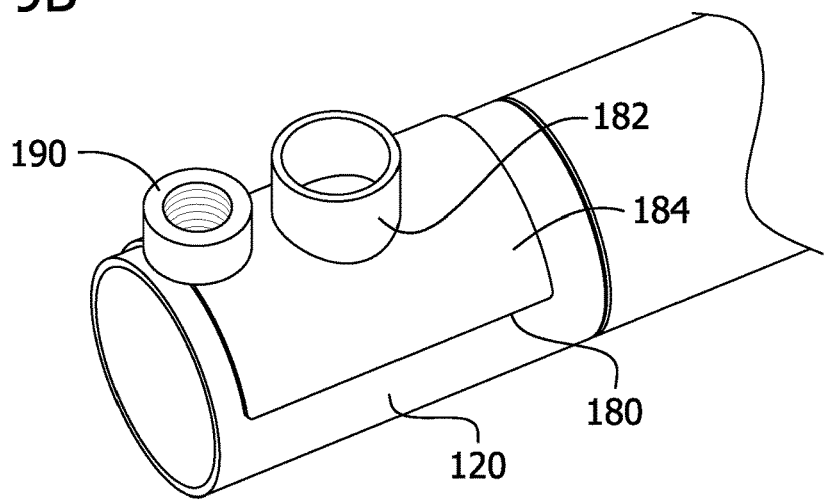
FIG. 9B is similar to FIG. 9A, illustrating a lateral bushing prior to bushing prior to installation in the lateral connector.
Figure 9C:
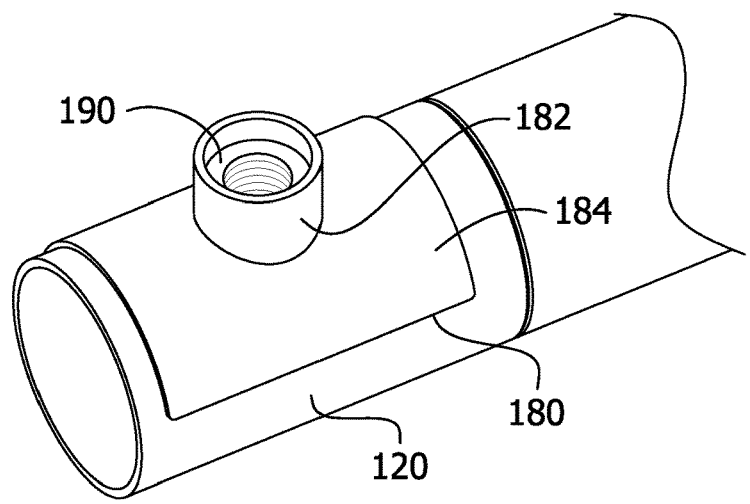
FIG. 9C is similar to FIG. 9B, illustrating the lateral bushing installed in the lateral connector.

Referring to FIGS. 9A-9C, in certain embodiments, a lateral connector 180 may be installed on the coupling member 120. In other words, a lateral coupling member can include a main coupling tube 120 and a lateral coupling tube 180 that is separately mounted on the main coupling tube. The lateral connector 180 includes a laterally extending tube 182 that can be in fluid communication with the coupling member 120 when the lateral connector is fully installed. In the illustrated embodiment, the lateral connector 180 includes a saddle portion 184 sized to extend around a portion of the circumference of the coupling member or main coupling tube 120. It will thus be appreciated that a rehabilitated pipe system can include a liner 112 lining an inside surface of a host pipe 10 and comprising a connecting section 115 extending into and being bonded to the main coupling tube 120. Suitably, the liner 112 and the main coupling tube 120 define respective holes (not shown) in register with the location of the lateral coupling tube 180 for fluidly coupling the liner with the lateral coupling tube. The liner 112 is adhesively sealed to the main coupling tube 120 so that a seal between the connecting section 115 and the main coupling tube is operative to prevent egress of liquid into an interface between the liner and the main coupling tube at the hole after the hole is formed.

Preferably, the saddle portion 184 is positioned so that a mechanical coupler (e.g., the mechanical coupler 124) can couple the coupling member 120 to another pipe section. For example, in the illustrated embodiment, the main coupling tube 120 has a first end segment configured to be positioned adjacent the end of the host pipe 10 and a second end segment opposite the first end segment configured for having the mechanical coupler 124 installed thereupon. The lateral connector 180 is placed on the main coupling tube 120 so that the lateral tube portion 182 is located between the first and second end segments of the main coupling tube. Moreover, the saddle portion 184 has a first end positioned adjacent the first end segment of the main coupling tube 120 and a second end positioned adjacent the second end segment of the main coupling tube. The second end of the saddle portion 184 is spaced apart from the second end segment of the main coupling tube 120 toward the first end segment to provide a space along the second end segment of the main coupling tube at which a mechanical coupler can be secured to the main coupling tube. When installed, an inner surface of the saddle portion 184 is adhered to an outer surface of the coupling member 120 to secure the lateral connector 180 to the coupling member.

A lateral coupler may couple the lateral tube 182 to a lateral fluid conducting structure (not shown). For example, a bushing 190 may be installed in the lateral tube 182 of the connector 182 to connect the lateral tube to another pipe section having a predetermined end configuration. Where the lateral tube 182 of the lateral connector 180 meets the coupling member 120, there is preferably a hole extending through the coupling member and the liner 112 installed therein. The seal between the liner 112 and coupling member 120 at the hole is such as to prevent the egress of liquid between the liner and coupling tube at the hole.

One embodiment of a rehabilitated pipe system comprises a lateral coupling member comprising a lateral coupling tube 180 and a main coupling tube 120 that extends between one host pipe 10A and another host pipe 10B. A single liner 112 can extend through the first host pipe 10A, the main coupling tube 120, and the second host pipe 10B to form the rehabilitated pipe system.

In a suitable method of installing the lateral connector 180 on the coupling member 120, one or both of the inner surface of the saddle portion 184 and the outer surface of the coupling member are prepared for adhesive bonding. For example, the prepared surface may be roughened, grooved, etc. to enhance mechanical bonding with a curable polymer that binds the lateral connector 180 to the coupling member. A curable polymer is applied to one or both of the inner surface of the saddle portion 184 and the outer surface of the coupling member 120. Preferably the curable polymer has the same or similar composition to the polymer in the coupling member 120 if the coupling member comprises a cured polymer. Likewise, if the lateral connector 180 comprises a cured polymer, the curable polymer used to bind the lateral connector 180 to the coupling member preferably has the same or similar composition to enhance chemical bonding. The lateral connector 180 is placed over the coupling member 120 so that curable polymer substantially fills the interface between the saddle portion 184 and the coupling member. The curable polymer cures to bind the lateral connector 180 to the coupling member 120. Either before or after the lateral connector 180 is installed on the coupling member 120, a hole is formed in the wall of the coupling member and the liner 112 disposed in the coupling member. The hole is positioned to be aligned with the lateral tube 182 of the lateral connector to fluidly connect the lateral tube with the interior of the coupling member. To install the bushing 190 in the lateral tube 182, the adjoining surfaces of the bushing and lateral tube are optionally prepared for adhesive bonding, curable polymeric material is placed on one or both of the adjoining surfaces, the bushing is positioned in the lateral tube so that curable polymer substantially fills and seals the interface between the bushing and the lateral tube, and the curable polymer cures. The interior of the busing 190 may be threaded for attachment of a lateral pipe.

Referring to FIG. 7, in one embodiment a pipe lining system 310 includes a coupling member 320 comprising a lateral fitting sized to be positioned between the inner ends of the pipe sections 10A, 10B. In the illustrated embodiment, the coupling member 320 comprises a tee fitting, but other types of lateral fittings (e.g., wyes, etc.) can also be used without departing from the scope of the invention. The tee fitting 320 includes a main tube 321 and a lateral tube 323 extending transverse to the main tube. Thus, in one or more embodiments, a main coupling tube 321 and a lateral coupling tube 323 can form a one-piece lateral coupling member 320. The tee fitting 320 can be formed of the same materials as the coupling members 120. Preferably, the tee fitting comprises a material that is capable of forming a strong adhesive bond with the liner 112. Like the coupling members 120, an inner surface of the tee fitting 320 can be prepared for bonding with the liner by abrading, forming grooves therein, etc. The inner surface of the tee fitting 320 can also be covered with a curable polymer prior to installing the liner 112, etc.

The main tube 321 of the tee fitting 320 is configured to receive a portion of the liner 112 that extends through the gap between the two pipe sections 10A, 10B. The liner 112 adheres to the fitting 320 to hold the fitting in place between the two pipe sections 10A, 10B. In the illustrated embodiment, the ends of the main tube 323 are positioned generally end to end with the inner ends of the pipe sections 10A, 10B. A mechanical coupler (not shown, but can be like mechanical coupler 124) can be used to couple the lateral tube 323 of the fitting 320 to another section of pipe such as an existing section of the host pipe system. Preferably the tee fitting 320 comprises a material and construction that can withstand the forces caused by a mechanical coupler joining the lateral tube 323 to another section of pipe. The portion of the pipe liner 112 that covers lateral opening in the main tube 321 is removed so that fluid may flow freely from the main tube to the lateral tube 223.

In one method of installing the pipe lining system 310, a pipe lining crew prepares the interior surface of the tee fitting 320 for adhesive bonding with the liner 112. For example, in some embodiments, the crew roughens the interior surface of the tee fitting 320 to improve mechanical bonding with a cured polymeric material and covers the interior surface with the same curable polymeric material that impregnates the liner 112. After preparation, the tee fitting 320 is positioned between the inner ends of the pipes 10A, 10B. Preferably, the crew positions the tee fitting 320 so that a first end of the main tube 321 is positioned generally end to end with the inner end of the pipe 10A and a second end of the main tube is positioned generally end to end with the inner end of the pipe 10B. With the tee fitting 320 properly positioned in the gap between the pipes 10A, 10B, the liner 112 is installed in the host pipe system so that it extends from a downstream portion of the pipe section 10A, through the main tube 221 of the tee fitting, to an upstream portion of the pipe section 10B. As above, the liner 112 can be installed through eversion, pull in, or any other suitable method. The crew expands the liner 112 so it contacts the interior surfaces of each of the pipe sections 10A, 10B and the main tube 321 of the tee fitting 320. Usually, the pressure in the liner 112 that causes it to expand is sufficient to hold the tee fitting 320 in place while the liner cures. After the 112 liner cures, the portion of the liner that covers the lateral opening in the main tube 321 of the tee fitting 320 is removed to fluidly connect the lateral tube 323 to the main tube. The portion of the liner 112 that covers the lateral opening may be removed robotically in certain preferred embodiments. The seal between the liner 112 and the interior surface of the main tube 321 is such as to prevent egress of the liquid between the liner and the main tube at the location where the liner is removed to open the lateral tube 323.

Although each of the above-described systems and methods uses the coupling members 120, 220, 320 to connect a newly formed pipe liner 112 that cures in the coupling member to another pipe section, the coupling members can also be used to retroactively connect a previously formed liner to another section of pipe. For example, where a pipe system has been previously lined with a liner, it may become necessary to remove a portion of the pipe for maintenance or repair of the pipe system. The previously lined pipe system includes at least one host pipe and a liner lining the interior surface of the host pipe from a downstream end of the lined pipe system to an upstream end of the lined pipe system.

In one method of coupling a previously lined host pipe to another section of pipe an end portion of the host pipe is removed without removing the cured liner that is originally positioned within the end portion of the host pipe. In other words, an end portion of the host pipe is removed after positioning the liner in the host pipe to expose the connecting section of the liner that has cured to conform to the interior surface of the end portion of the host pipe. This leaves a connecting section of the cured liner extending out of the host pipe. As discussed below, a coupling member 120, 220, 230 having an interior sized to receive the connecting section of the cured liner therein and to fit closely around the exterior of the connecting section is used to couple the cured liner to another pipe section. One or both of the exterior surface of the cured connecting section of the liner and the interior surface of a coupling member 120, 220, 320 is prepared for adhesive bonding. For example, the prepared surface can be roughened or grooved to enhance mechanical bonding with a curable polymer. One or both of the exterior surface of the connecting section of the cured liner and the interior surface of a coupling member 120, 220, 320 is coated with a curable polymer. Preferably the curable polymer has the same or similar composition to the cured polymer in the connecting section of the liner to enhance chemical bonding. Likewise, if the coupling member is made from fiber reinforced polymer or other polymeric material, the curable polymer preferably has the same or similar composition to the polymer of the coupling member to enhance chemical bonding. The coupling member 120, 220, 320 is installed on the connecting section of the cured liner so that the connecting section is received in the interior of the coupling member. Preferably, the coupling member 120, 220, 320, is positioned over the connecting section of the liner so that the coupling member is positioned generally end to end with the end of the host pipe. Curable polymer substantially fills gaps in the annular interface between the cured liner and the coupling member that may exist. After the curable polymer cures, it sealingly adheres the coupling member 120, 220, 320 to the connecting section of the cured liner. A mechanical coupler 124 is used to couple the coupling member 120, 220, 230 to another section of pipe, thereby coupling the lined host pipe to the other section of pipe.

Other Statements of the Invention

The following are statements of the invention described in the present application. They constitute applicant's statement of invention(s) believed to be patentable and may subsequently be presented as claims.

A. A method for rehabilitating a pipe system, the method comprising:
  lining a host pipe of the pipe system
  positioning a coupling member in the pipe system so that a connecting section of the liner is received in the coupling member, and the coupling member is located generally end to end with an end of the host pipe, the coupling member being configured for being operatively coupled to a mechanical coupler while it is being positioned end to end with the host pipe;
  adhesively bonding the connecting section of the liner to the coupling member; and
  fluidly coupling the coupling member to another fluid conducting structure using the mechanical coupler, whereby the liner, the coupling member, and the mechanical coupler form a fluid tight connection between the host pipe and the other fluid conducting structure.

B. A method as set forth in A wherein the step of adhesively bonding the connecting section of the liner to the coupling member comprises curing a curable polymer impregnating at least the connecting section of the liner.

C. A method as set forth in B further comprising impregnating the liner with the curable polymer before positioning the liner in the pipe system.

D. A method as set forth in either of B and C wherein the coupling member comprises a polymer having a composition that is closely similar to the composition of the curable polymer, said step of adhesively bonding comprising creating a chemical adhesive bond between the polymer of the coupling member and the polymer of the liner.

E. A method as set forth in any of A-D further comprising forming a gap in the pipe system extending between said end of the host pipe and an opposing end of another host pipe of the pipe system.

F. A method a set forth in E further comprising:
  lining the other host pipe;
  positioning another coupling member in the pipe system so that a connecting section of the other liner is received in the other coupling member, and the other coupling member is located generally end to end with an end of the other host pipe; and
  adhesively bonding the connecting section of the other liner to the other coupling member.

G. A method as set forth in F wherein the other fluid conducting structure comprises a connecting tube, the method further comprising positioning the connecting tube in the gap such that the connecting tube extends between opposing ends of the coupling members.

H. A method as set forth in G further comprising coupling a mechanical coupler to the other coupling member and the connecting tube to create a fluid tight connection between the host pipes.

I. A method as set forth in any of A-H wherein the step of fluidly coupling the coupling member to the other fluid conducting structure comprises bolting a flange portion of the coupling member to the fluid conducting structure.

J. A method as set forth in any of A-I wherein the step of adhesively bonding comprises applying an adhesive to one of the connecting section of the liner and the coupling member after curable polymer impregnating the connecting section has at least partially cured.

K. A method as set forth in any of A-J wherein the positioning step comprises positioning the liner before positioning the coupling member.

L. A method as set forth in K further comprising removing a portion of the host pipe after positioning the liner in the host pipe to expose the connecting section of the liner.

M. A method as set forth in any of A-L further comprising preparing an interior surface of the coupling member for adhesively bonding to the connecting section of the liner before the liner is positioned in the coupling member.

N. A method for rehabilitating a pipe system, the method comprising:
  positioning a liner comprising a curable polymer in a host pipe of the pipe system so that the liner lines an interior surface of the host pipe;
  curing the curable polymer;
  removing an end portion of the host pipe to expose a connecting section of the liner cured to conform to the interior surface of the end portion of the host pipe;
  positioning a coupling member configured for being operatively coupled to a mechanical coupler so that the connecting section of the cured liner is received in the coupling member; and
  adhesively bonding the connecting section of the liner to the coupling member whereby the connecting section of the liner sealingly bonds to the coupling member.

O. A method as set forth in N further comprising fluidly coupling the coupling member to another fluid conducting structure using the mechanical coupler.

P. A method as set forth in either of N and O further comprising any of the statements recited in one or more of B-M.

Q. A method for rehabilitating a pipe system, the method comprising:
  positioning a connecting section of a liner extending through a host pipe of the pipe system within a main coupling tube positioned generally end to end with the host pipe;
  forming a hole in the connecting section of the liner to fluidly couple a lateral coupling tube extending from the main coupling tube to an interior of the liner; and
  adhesively bonding the connecting section of the liner to the main coupling tube using a curable polymer, the cured curable polymer forming a seal between the connecting section of the liner and the main coupling tube operative to prevent egress of liquid into an interface between the liner and the main coupling tube at the hole after the hole is formed.

R. A method as set forth in Q wherein the step of forming the hole is performed after the step of adhesively bonding.

S. A method as set forth in one of Q and R wherein the lateral coupling tube is operatively connected to the main coupling tube during the positioning step.

T. A method as set forth in any of Q-S wherein the lateral coupling tube and the main coupling tube form a one-piece lateral coupling member.

U. A method as set forth in any of Q-S further comprising separately mounting the lateral coupling tube on the main coupling tube.

V. A method as set forth in U wherein the step of mounting the lateral coupling tube comprises adhesively bonding a saddle portion of the lateral coupling tube to an exterior of the main coupling tube.

W. A method as set forth in either of U and V wherein the step of mounting the lateral coupling tube comprises positioning the lateral coupling tube on the main coupling tube so that an end of the saddle portion is spaced apart inboard of an adjacent end portion of the main coupling tube sized and arranged for being coupled to a mechanical coupler.

X. A method as set forth in any of Q-W further comprising fluidly coupling the end portion of the main coupling tube to another fluid conducting structure using the mechanical coupler.

Y. A method as set forth in any of Q-S and U-X further comprising forming a hole in the main coupling tube to fluidly couple an interior of the main coupling tube to an interior of the lateral coupling tube.

Z. A method as set forth in any of Q-Y further comprising installing a bushing in the lateral coupling tube configured for being fluidly coupled to a lateral fluid conducting structure.

AA. A method as set forth in Z wherein the step of installing the bushing comprises adhesively bonding the bushing to the lateral coupling tube to form a liquid tight seal at an interface between the bushing and the lateral coupling tube.

AB. A method as set forth in claim 16 further comprising operatively connecting a laterally extending fluid conducting structure of the pipe system to the lateral coupling tube of the coupling member.

AC. A rehabilitated pipe system comprising:
an existing host pipe;
a coupling member positioned at an end of the host pipe;
a liner lining an inside surface of the host pipe and comprising a connecting section extending into the coupling member and being bonded to the coupling member; and
a ductile iron coupler securing the coupling member to another fluid conducting structure and thereby fluidly coupling the liner to the other fluid conducting structure.

AD. A rehabilitated pipe system as set forth in AC wherein the rehabilitated pipe system includes the fluid conducting structure and the fluid conducting structure comprises a connecting tube.

AE. A rehabilitated pipe system as set forth in AD further comprising:
another existing host pipe;
another coupling member positioned at an end of the other host pipe;
another liner lining an inside surface the other host pipe and comprising a connecting section extending into the other coupling member and being bonded to the other coupling member; and
another ductile iron coupler securing the other coupling member to the connecting tube and thereby fluidly coupling the other liner to the connecting tube and to said liner.

AF. A rehabilitated pipe system as set forth in any of AC-AE wherein the coupling member comprises a main coupling tube having a first end segment adjacent the existing host pipe and a second end segment opposite the first end segment.

AG. A rehabilitated pipe system as set forth in AF wherein the ductile iron coupler is secured to the second end segment of the main coupling tube.

AH. A rehabilitated pipe system as set forth in AG further comprising a lateral coupling tube extending laterally from the main coupling tube at a location between the first and second end segments of the main coupling tube.

AI. A rehabilitated pipe system as set forth in AH wherein a hole is formed in the connecting section of the liner that fluidly couples the main coupling tube to the lateral coupling tube.

AJ. A rehabilitated pipe system as set forth in either of AH and AI further comprising a lateral coupler coupling the lateral coupling tube to a lateral fluid conducting structure.

AK. A rehabilitated pipe system as set forth in AJ wherein the lateral coupler comprises a bushing sealingly received in the lateral coupling tube.

AL. A rehabilitated pipe system as set forth in any of AH-AK wherein the main coupling tube and the lateral coupling tube form a one-piece lateral coupling member.

AM. A rehabilitated pipe system as set forth in any of AH-AK wherein the lateral coupling tube is separately connected to the main coupling tube.

AN. A rehabilitated pipe system as set forth in AM wherein the lateral coupling tube comprises a saddle portion.

AO. A rehabilitated pipe system as set forth in AN wherein the saddle portion is adhesively bonded to the main coupling tube.

AP. A rehabilitated pipe system as set forth in either of AN and AO wherein the saddle portion has a first end located adjacent the first end segment of the main coupling tube and a second end located adjacent the second end segment of the main coupling tube.

AQ. A rehabilitated pipe system as set forth in AP wherein the second end of the saddle portion is spaced apart from the second end segment of the main coupling tube toward the first end segment of the main coupling tube to provide a space along the second end segment of the main coupling tube at which the ductile iron coupler is secured to the main coupling tube.

AR. A rehabilitated pipe system comprising:
an existing host pipe having an end;
a coupling member having a first end segment located adjacent the end of the existing host pipe and a second end segment opposite the first end segment and defining a flange;
a liner lining an inside surface the host pipe and comprising a connecting section extending into the coupling member and being bonded to the coupling member; and
a fastener securing the flange of the coupling member to a flange of another fluid conducting structure and thereby fluidly coupling the liner to the other fluid conducting structure.

AS. A rehabilitated pipe system as set forth in AR wherein the fastener comprises a bolt.

AT. A rehabilitated pipe system as set forth in either of AR and AS wherein the rehabilitated pipe system includes the fluid conducting structure and the fluid conducting structure comprises a connecting tube.

AU. A rehabilitated pipe system as set forth in claim AT further comprising:
another existing host pipe;
another coupling member positioned at an end of the other host pipe;
another liner lining an inside surface the other host pipe and comprising a connecting section extending into the other coupling member and being bonded to the other coupling member; and coupler securing the other coupling member to the connecting tube and thereby fluidly coupling the other liner to the connecting tube and to said liner.

AV. A rehabilitated pipe system as set forth in any of AR-AU wherein the coupling member comprises a main coupling tube defining the first and second end segments of the coupling member and a lateral coupling tube extending laterally from the main coupling tube at a location between the first and second end segments of the coupling member.

AW. A rehabilitated pipe system as set forth in AV wherein a hole is formed in the connecting section of the liner that fluidly couples the main coupling tube to the lateral coupling tube.

AX. A rehabilitated pipe system as set forth in either of AV and AW further comprising a lateral coupler coupling the lateral coupling tube to a lateral fluid conducting structure.

AY. A rehabilitated pipe system as set forth in AX wherein the lateral coupler comprises a bushing sealingly received in the lateral coupling tube.

AZ. A rehabilitated pipe system as set forth in any of AV-AY wherein the main coupling tube and the lateral coupling tube form a one-piece lateral coupling member.

BA. A rehabilitated pipe system as set forth in any of AV-AY wherein the lateral coupling tube is separately connected to the main coupling tube.

BB. A rehabilitated pipe system as set forth in BA wherein the lateral coupling tube comprises a saddle portion.

BC. A rehabilitated pipe system as set forth in BB wherein the saddle portion is adhesively bonded to the main coupling tube.

BD. A rehabilitated pipe system as set forth in either of BB and BC wherein the saddle portion has a first end located adjacent the first end segment of the coupling member and a second end located adjacent the second end segment of the main coupling member.

BE. A rehabilitated pipe system as set forth in BD wherein the second end of the saddle portion is spaced apart from the flange.

BF. A rehabilitated pipe system comprising:
an existing host pipe having an end;
a coupling member comprising a main coupling tube having a first end segment located adjacent the end of the existing host pipe and a second end segment opposite the first end segment and a lateral coupling tube extending laterally from the main coupling tube at a location between the first and second end segments thereof;
a liner lining an inside surface the host pipe and comprising a connecting section extending into the main coupling tube and being bonded to the main coupling tube, the liner defining a hole in register with the location of the lateral coupling tube for fluidly coupling the liner with the lateral coupling tube; and
a lateral coupler coupling the lateral coupling tube to a lateral fluid conducting structure and thereby fluidly coupling the liner to the lateral fluid conducting structure.

BG. A rehabilitated pipe system as set forth in BF wherein the lateral coupler comprises a bushing.

BH. A rehabilitated pipe system as set forth in BG wherein the bushing is internally threaded BI. A rehabilitated pipe system as set forth in either of BG and BH wherein the bushing is sealingly received in the lateral coupling tube.

BJ. A rehabilitated pipe system as set forth in any of BG-BI wherein the bushing is adhesively bonded to the lateral coupling tube.

BK. A rehabilitated pipe system as set forth in any of BF-BJ wherein the main coupling tube and the lateral coupling tube form a one-piece lateral coupling member.

BL. A rehabilitated pipe system as set forth in any of BF-BJ wherein the lateral coupling tube is separately connected to the main coupling tube.

BM. A rehabilitated pipe system as set forth in BL wherein the lateral coupling tube comprises a saddle portion.

BN. A rehabilitated pipe system as set forth in BM wherein the saddle portion is adhesively bonded to the main coupling tube.

BO. A rehabilitated pipe system as set forth in any of BF-BN further comprising a parallel fluid conducting structure adjacent the second end segment of the main coupling tube.

BP. A rehabilitated pipe system as set forth in BO wherein the parallel fluid conducting structure includes another host pipe of the pipe system.

BQ. A rehabilitated pipe system as set forth in BP wherein the liner includes a segment lining the other host pipe.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:
1. A method for rehabilitating a pipe system, the method comprising:
lining a host pipe of the pipe system with a liner;
positioning a coupling member in the pipe system so that a connecting section of the liner is received in the coupling member, and the coupling member is located substantially end to end with an end of the host pipe, the coupling member being configured for being operatively coupled to a mechanical coupler while the coupling member is being positioned end to end with the host pipe;
adhesively bonding the connecting section of the liner to the coupling member; and
fluidly coupling the coupling member to another fluid conducting structure using the mechanical coupler, whereby the liner, the coupling member, and the mechanical coupler form a fluid tight connection between the host pipe and the other fluid conducting structure;
wherein the step of adhesively bonding the connecting section of the liner to the coupling member comprises curing a curable polymer impregnating at least the connecting section of the liner.

2. A method as set forth in claim 1 further comprising impregnating the liner with the curable polymer before positioning the liner in the pipe system.

3. A method as set forth in claim 1 wherein the coupling member comprises a polymer having a composition that is closely similar to the composition of the curable polymer, said step of adhesively bonding comprising creating a chemical adhesive bond between the polymer of the coupling member and the polymer of the liner.

4. A method as set forth in claim 1 further comprising forming a gap in the pipe system extending between said end of the host pipe and an opposing end of another host pipe of the pipe system.

5. A method a set forth in claim 4 further comprising:
lining the other host pipe with another liner;
positioning another coupling member in the pipe system so that a connecting section of the other liner is received in the other coupling member, and the other coupling member is located substantially end to end with an end of the other host pipe; and
adhesively bonding the connecting section of the other liner to the other coupling member.

6. A method as set forth in claim 5 wherein the other fluid conducting structure comprises a connecting tube, the method further comprising positioning the connecting tube in the gap such that the connecting tube extends between opposing ends of the coupling members.

7. A method as set forth in claim 6 further comprising coupling a mechanical coupler to the other coupling member and the connecting tube to create a fluid tight connection between the host pipes.

8. A method as set forth in claim 1 wherein the step of fluidly coupling the coupling member to the other fluid conducting structure comprises bolting a flange portion of the coupling member to the fluid conducting structure.

9. A method as set forth in claim 1 wherein the positioning step comprises positioning the liner before positioning the coupling member.

10. A method as set forth in claim 9 further comprising removing a portion of the host pipe after positioning the liner in the host pipe to expose the connecting section of the liner.

11. A method as set forth in claim 1 further comprising preparing an interior surface of the coupling member for adhesively bonding to the connecting section of the liner before the liner is positioned in the coupling member.

12. A method for rehabilitating a pipe system, the method comprising:
positioning a liner comprising a curable polymer in a host pipe of the pipe system so that the liner lines an interior surface of the host pipe;
curing the curable polymer;
removing an end portion of the host pipe to expose a connecting section of the liner cured to conform to the interior surface of the end portion of the host pipe;
positioning a coupling member configured for being operatively coupled to a mechanical coupler so that the connecting section of the cured liner is received in the coupling member; and
adhesively bonding the connecting section of the liner to the coupling member whereby the connecting section of the liner sealingly bonds to the coupling member.

13. A method as set forth in claim 12 further comprising fluidly coupling the coupling member to another fluid conducting structure using the mechanical coupler.

14. A method for rehabilitating a pipe system, the method comprising:
positioning a connecting section of a liner extending through a host pipe of the pipe system within a main coupling tube positioned substantially end to end with the host pipe;
forming a hole in the connecting section of the liner to fluidly couple a lateral coupling tube extending from the main coupling tube to an interior of the liner; and
adhesively bonding the connecting section of the liner to the main coupling tube using a curable polymer, the cured curable polymer forming a seal between the connecting section of the liner and the main coupling tube operative to prevent egress of liquid into an interface between the liner and the main coupling tube at the hole after the hole is formed.

15. A method as set forth in claim 14 wherein the step of forming the hole is performed after the step of adhesively bonding.

16. A method as set forth in claim 14 wherein the lateral coupling tube is operatively connected to the main coupling tube during the positioning step.

17. A method as set forth in claim 16 wherein the lateral coupling tube and the main coupling tube form a one-piece lateral coupling member.

18. A method as set forth in claim 14 further comprising separately mounting the lateral coupling tube on the main coupling tube.

19. A method for rehabilitating a pipe system, the method comprising:
lining a host pipe of the pipe system with a liner;
positioning a coupling member in the pipe system so that a connecting section of the liner is received in the coupling member, and the coupling member is located substantially end to end with an end of the host pipe, the coupling member being configured for being operatively coupled to a mechanical coupler while the coupling member is being positioned end to end with the host pipe;
adhesively bonding the connecting section of the liner to the coupling member; and
fluidly coupling the coupling member to another fluid conducting structure using the mechanical coupler, whereby the liner, the coupling member, and the mechanical coupler form a fluid tight connection between the host pipe and the other fluid conducting structure;
wherein the step of adhesively bonding comprises applying an adhesive to one of the connecting section of the liner and the coupling member after a curable polymer impregnating the connecting section has at least partially cured.

20. A method as set forth in claim 19 further comprising impregnating the liner with the curable polymer before positioning the liner in the pipe system.

21. A method as set forth in claim 19 wherein the coupling member comprises a polymer having a composition that is closely similar to the composition of the curable polymer, said step of adhesively bonding comprising creating a chemical adhesive bond between the polymer of the coupling member and the polymer of the liner.

22. A method as set forth in claim 19 further comprising forming a gap in the pipe system extending between said end of the host pipe and an opposing end of another host pipe of the pipe system.

23. A method a set forth in claim 22 further comprising:
lining the other host pipe with another liner;
positioning another coupling member in the pipe system so that a connecting section of the other liner is received in the other coupling member, and the other coupling member is located substantially end to end with an end of the other host pipe; and
adhesively bonding the connecting section of the other liner to the other coupling member.

24. A method as set forth in claim 23 wherein the other fluid conducting structure comprises a connecting tube, the method further comprising positioning the connecting tube in the gap such that the connecting tube extends between opposing ends of the coupling members.

25. A method as set forth in claim 24 further comprising coupling a mechanical coupler to the other coupling member and the connecting tube to create a fluid tight connection between the host pipes.

26. A method as set forth in claim 19 wherein the step of fluidly coupling the coupling member to the other fluid conducting structure comprises bolting a flange portion of the coupling member to the fluid conducting structure.

27. A method as set forth in claim 19 wherein the positioning step comprises positioning the liner before positioning the coupling member.

28. A method as set forth in claim 27 further comprising removing a portion of the host pipe after positioning the liner in the host pipe to expose the connecting section of the liner.

29. A method as set forth in claim 19 further comprising preparing an interior surface of the coupling member for adhesively bonding to the connecting section of the liner before the liner is positioned in the coupling member.

* * * * *